(12) United States Patent
Mezzino et al.

(10) Patent No.: US 11,898,647 B2
(45) Date of Patent: Feb. 13, 2024

(54) BUTTERFLY VALVE ASSEMBLY

(71) Applicant: Microtecnica S.r.l., Turin (IT)

(72) Inventors: Giacomo Mezzino, Turin (IT); Gianfranco Salvatoriello, Turin (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 17/575,818

(22) Filed: Jan. 14, 2022

(65) Prior Publication Data

US 2022/0235876 A1    Jul. 28, 2022

(30) Foreign Application Priority Data

Jan. 22, 2021    (EP) .................................... 21152975

(51) Int. Cl.
*F16K 17/10* (2006.01)
*F16K 1/22* (2006.01)
*F16K 17/04* (2006.01)

(52) U.S. Cl.
CPC ............. *F16K 17/10* (2013.01); *F16K 1/221* (2013.01); *F16K 17/048* (2013.01)

(58) Field of Classification Search
CPC .......... F16K 17/10; F16K 1/221; F16K 35/06; F16K 35/025; F16K 31/124; F16K 17/22; F16K 17/32
See application file for complete search history.

(56) References Cited

U.S. PATENT DOCUMENTS

| 4,147,475 A | 4/1979 | Shoop et al. |
| 4,617,958 A | 10/1986 | Seidel et al. |
| 5,067,506 A * | 11/1991 | Ball ...................... F16K 1/2261 251/283 |
| 5,238,220 A | 8/1993 | Shell et al. |
| 5,819,791 A * | 10/1998 | Chronister .......... F16K 15/1821 251/83 |

(Continued)

FOREIGN PATENT DOCUMENTS

| EP | 2813688 A2 | 12/2014 |
| JP | S5116224 U | 2/1976 |
| WO | 2019174685 A1 | 9/2019 |

OTHER PUBLICATIONS

Extended European Search Report for International Application No. 21152975.5 dated Jul. 15, 2021, 7 pages.

*Primary Examiner* — Reinaldo Sanchez-Medina
*Assistant Examiner* — Nicole Gardner
(74) *Attorney, Agent, or Firm* — CANTOR COLBURN LLP

(57) ABSTRACT

A butterfly valve assembly includes: a butterfly element configured to control fluid flow through a main conduit; and a butterfly controller configured to control the butterfly element. The controller includes a first chamber for receiving fluid at a first pressure, a second chamber for receiving fluid at a second pressure, and an actuator responsive to the first pressure and the second pressure. The assembly also includes a relief valve arranged to regulate the first pressure in the first chamber within a predetermined pressure range, wherein the relief valve comprises an adjustment mechanism for adjusting the predetermined pressure range. The butterfly valve assembly may comprise a manual override operable to lock the butterfly element in a fully open position or a fully closed position.

14 Claims, 9 Drawing Sheets

(56) References Cited

U.S. PATENT DOCUMENTS

| | | | |
|---|---|---|---|
| 7,731,152 B2* | 6/2010 | Abel | F16K 1/221 |
| | | | 251/63.5 |
| 8,047,226 B2* | 11/2011 | Kesner | F01D 17/145 |
| | | | 251/282 |
| 8,376,311 B2 | 2/2013 | Marshall et al. | |
| 9,110,475 B2* | 8/2015 | Simpson | F16K 31/1635 |
| 9,341,280 B2 | 5/2016 | Pirat | |
| 10,241,523 B2 | 3/2019 | Hielkema et al. | |
| 10,301,963 B2 | 5/2019 | Grigorov et al. | |
| 2009/0229682 A1* | 9/2009 | Fowler | F16K 35/02 |
| | | | 251/109 |
| 2010/0006165 A1* | 1/2010 | Banta | F01D 17/26 |
| | | | 137/625.63 |
| 2013/0283762 A1 | 10/2013 | Simpson et al. | |
| 2017/0336812 A1 | 11/2017 | Dante et al. | |
| 2020/0386068 A1* | 12/2020 | Beard | E21B 33/06 |

* cited by examiner

BUTTERFLY VALVE ASSEMBLY

This application claims priority to European Patent Application No. 21152975.5 filed Jan. 22, 2021, the entire contents of which is incorporated herein by reference.

FIELD

The present invention relates to a butterfly valve assembly, particularly to a butterfly valve assembly comprising a relief valve comprising an adjustment mechanism, and/or to a butterfly valve assembly comprising a manual override.

BACKGROUND

Butterfly valves are typically provided to regulate downstream pressure in fluid in a conduit. They comprise a butterfly element, such as a disc or gate, inside the conduit which is rotatable to regulate fluid flow through the conduit depending on the degree of rotation of the butterfly element. Since butterfly valves are provided to regulate pressure, they typically include a feedback mechanism controlling the rotation of the butterfly element based on the pressure downstream thereof.

One mechanism for an electronically controlled butterfly valve includes a pressure sensor and a motor to drive the butterfly element in response to signals from the pressure sensor. Such electronic valves are at risk in high temperature environments because of their electronic components. Further, the need to be failsafe (so that the butterfly element is open in the event of a failure) increases electronic valves' design complexity.

For high temperature environments, fluid-driven butterfly valves, such as pneumatic or hydraulic valves, may be used instead. However, the need to calibrate the butterfly valve for each particular system requires that they be adjustable. The mechanisms for such adjustment are typically difficult to access and require significant force to change. Moreover, such valves have limited functionality. There therefore exists a need for improvement of butterfly valves, particularly for butterfly valves for use in high temperature environments (e.g. in aircraft) that lack electronic control.

SUMMARY

According to a first aspect of the invention there is provided a butterfly valve assembly comprising: a butterfly element configured to control fluid flow through a main conduit; and a butterfly controller configured to control the butterfly element, comprising a first chamber for receiving fluid at a first pressure, a second chamber for receiving fluid at a second pressure, and an actuator responsive to the first pressure and the second pressure; and a relief valve arranged to regulate the first pressure in the first chamber within a predetermined pressure range, wherein the relief valve comprises an adjustment mechanism for adjusting the predetermined pressure range.

The operation of the butterfly valve assembly may therefore be controlled by adjusting the adjustment mechanism of the relief valve, to thereby adjust the predetermined pressure range. By adjusting the predetermined pressure range, the first pressure of the fluid in the first chamber can be controlled so that movement of the actuator can be affected, which in turn affects movement of the butterfly element and fluid flow through the butterfly valve assembly. Since adjustment is provided by the adjustment mechanism of the relief valve, it can be easier to adjust (e.g. require less force) than an alternative arrangement (e.g. in which the butterfly controller itself is adjusted). The adjustment mechanism may also be more easily accessible than if it were part of the butterfly controller (e.g. disposed within the first or second chamber).

The butterfly valve assembly may comprise the main conduit. The butterfly element may be within the main conduit. The butterfly element may be configured to control fluid flow through the main conduit by rotation between a first butterfly element position and a second butterfly element position. The butterfly element may permit as much fluid flow as possible through the main conduit in the first butterfly element position, and/or may prevent as much fluid flow as possible through the main conduit in the second butterfly element position. The butterfly element may also take any position between the first butterfly element position and the second butterfly element position, and may thereby control or regulate fluid flow through the main conduit. The butterfly element may be rotatable about an axis through the centre of the conduit e.g. about an axis coinciding with a diameter of the main conduit. The butterfly element may therefore comprise a shaft for rotation about the axis. The axis may be perpendicular to the direction of fluid flow through the main conduit during use. The butterfly element may therefore rotate to control fluid flow through the conduit. Different degrees of rotation may permit (or prevent) different amounts of fluid to flow past the butterfly element along the main conduit.

The butterfly element may be shaped to match or complement a cross-section of the main conduit. For example, the butterfly element may be a disc, and the cross-section of the main conduit may be circular. The butterfly element may have an area slightly smaller than the cross-section of the main conduit, so that when it is in the first butterfly element position it closes substantially the entire cross-section of the main conduit. The butterfly element may be generally flat, and may preferably be substantially planar, so that when rotated to the second butterfly element position it obscures as little of the main conduit as possible. However, the butterfly element may have any suitable shape for rotation within the main conduit to thereby control fluid flow.

The butterfly controller may be configured to control rotation of the butterfly element between the first butterfly element position (e.g. a fully open position) and the second butterfly element position (e.g. a fully closed position). The actuator may move between a first position at one extreme of its travel (e.g. a fully open position) and a second position at the other extreme of its travel (e.g. a fully closed position). The actuator of the butterfly controller may comprise a piston. The piston may be moveable between a first piston position and a second piston position. The first chamber and the second chamber may be defined as complementary portions of a fluid chamber of the butterfly controller. The piston may be disposed in the fluid chamber. The piston may be disposed between the first chamber and the second chamber. The piston may delimit the first chamber and the second chamber in the fluid chamber. The piston may therefore be exposed to the first and second fluid pressures, and may be moveable in response thereto.

The piston may comprise a mechanical connection coupling to the butterfly element to rotate the butterfly element with movement of the piston in the fluid chamber. The connection may rotate the butterfly element by approximately 90° between movement of the piston from the first piston position to the second piston position. The piston (or more generally the actuator) may move (e.g. rotate) the butterfly element by different amounts depending upon its position within the fluid chamber, and therefore depending on the first pressure and second pressure in the respective first and second chambers. Higher pressure in the first chamber may cause the actuator to move to its first position, and thereby rotate the butterfly element to its first butterfly element position. Higher pressure in the second chamber may cause the actuator to move to its second position, and thereby rotate the butterfly element to its second butterfly element position.

Thus, the interaction of first and second pressures within the first and second chambers will affect the position of the actuator, and hence will also affect the position of the butterfly element.

The relief valve may be a pilot valve, and may be operable with relatively little flow. The relief valve may be fluidly connected to the main conduit upstream of the butterfly element. The relief valve may permit fluid flow to the atmosphere (or otherwise out of the butterfly valve assembly) when the first pressure reaches a predetermined threshold, in order to regulate the first pressure within the predetermined pressure range. The adjustment mechanism may be operable to change the predetermined threshold, and thereby adjust the predetermined pressure range. The adjustment mechanism may hence adjust the first pressure of fluid within the first chamber of the butterfly controller, which in turn will affect the behaviour of the actuator in the fluid chamber, and will thereby affect movement of the butterfly element.

The adjustment mechanism of the relief valve may comprise a spring and a tuning screw operable to adjust the pressure at which the relief valves opens, to thereby adjust the predetermined pressure range. The adjustment mechanism of the relief valve may be any suitable mechanism for adjusting operation of the relief valve. The adjustment mechanism of the relief valve may be an adjustable spring. The adjustable spring may be adjustable to change when the predetermined threshold at which the relief valve vents fluid from the butterfly valve assembly. The adjustment mechanism may comprise a spring and a tuning screw operable to change preloading of the spring. The tuning screw may therefore be operable to adjust the predetermined threshold of the relief valve, and thereby adjust the predetermined range of the relief valve.

The tuning screw may be located in the butterfly valve assembly so that it is always accessible and adjustable from outside the butterfly valve assembly. The tuning screw may be located on an external surface of the butterfly valve assembly. The tuning screw may be accessible (and therefore adjustable) during use of the butterfly valve assembly. The tuning screw may be arranged so that it is accessible (and therefore adjustable) once the butterfly valve assembly is installed in a wider system. The tuning screw may be arranged so that it is accessible before and after assembly of the butterfly valve assembly. The butterfly valve assembly may be configured so that the tuning screw is adjustable without disassembly of the butterfly valve assembly. The tuning screw may therefore be used to calibrate the butterfly valve assembly, even during use e.g. while the butterfly assembly is installed in an anti-ice system.

The butterfly controller may comprise a biasing element arranged to bias the actuator to a first position. The biasing element may be within the first chamber of the butterfly controller. The biasing element may bias the piston to the first piston position, which may be associated with the first butterfly element position e.g. the fully open position. The biasing element may be a spring. Thus, the butterfly controller will tend to move the butterfly element to the fully open position, unless the second pressure of fluid in the second chamber prevents it.

The buttery valve assembly may not comprise a means of adjusting or preloading the biasing element directly, the biasing element and/or the butterfly controller can therefore be a simpler than in other assemblies e.g. assemblies that comprise means of adjusting the biasing element.

The butterfly valve assembly may comprise a shut-off valve arranged to control the second pressure of fluid in the second chamber of the butterfly controller. The shut-off valve may be fluidly connected to the main conduit downstream of the butterfly element. The shut-off valve may be arranged to provide to the second chamber of the butterfly controller either (i) fluid from the main conduit downstream of butterfly element, or (ii) fluid from a source other than the main conduit downstream of the butterfly element. The fluid from the other source may be at a sufficiently high pressure to cause the actuator to move to its second position and thereby move the butterfly element to its fully closed position e.g. fluid at supply pressure.

The shut-off valve may therefore be arranged to switch the butterfly valve assembly between two modes. The first mode may be a regulation mode in which the second pressure of the fluid in the second chamber is indicative of fluid pressure in the main conduit immediately downstream of the butterfly element, and the actuator may therefore be responsive to that pressure in order to regulate fluid flow through the butterfly valve assembly. The second mode may be a shut-off mode in which the butterfly element moves to its fully closed position.

The butterfly valve assembly may comprise an orifice fluidly connecting the relief valve to the main conduit at a location upstream of the butterfly element, wherein the orifice is configured to restrict fluid flow through itself.

The orifice may be immediately upstream of the butterfly element. The orifice may have a smaller cross-section than either the main conduit, or the line to which it passes fluid. The orifice may therefore be a flow restrictor, and may be a fixed flow restrictor e.g. a restrictor of a fixed size.

The orifice may be provided to stabilise operation of the relief valve, and hence stabilise the operation of the butterfly valve assembly. The orifice may reduce the dynamic effect of pressure changes on the relief valve. The orifice may be configured to damped (e.g. reduce the rate of) pressure changes experienced by the relief valve. The orifice may therefore damped pressure changes of the first pressure of fluid in the first chamber.

The butterfly valve assembly may comprise another, second orifice fluidly connecting the shut-off valve to the main conduit at a location downstream of the butterfly element. The second orifice may be immediately downstream of the butterfly element. The second orifice may be operable in a similar manner to the first orifice and may comprise analogous features. The second orifice may be configured to damped pressure changes of the second pressure of the fluid in the fluid in the second chamber.

The first and second orifices may therefore be configured (e.g. sized) to limit flow therethrough and thereby reduce the rate of pressure changes in the first and second chambers compared to the rate of pressure changes in the main conduit.

The butterfly valve assembly may comprise a manual override operable to lock the butterfly element in a fully open position or a fully closed position. The manual override may be operable to restrict movement of the butterfly element.

The manual override may be operable to lock the butterfly element in either a fully open configuration or a fully closed configuration, depending on its arrangement. That is, the manual override may be operable to lock the butterfly element in either or both of a fully open and fully closed configuration (albeit at different times—i.e. not both configurations at once). The manual override can therefore be used to fix the butterfly element in its fully open position, and to fix the butterfly element in its fully closed position. Thus, the automatic pressure regulation of the butterfly valve assembly can be overridden.

The manual override may comprise an override shaft rotatable between a first neutral position in which rotation of the butterfly element relative to the override shaft is permitted, and a second override position in which rotation of the butterfly element relative to the override shaft is prevented by interaction of part of the butterfly element with part of the override shaft.

Thus, the override shaft may be rotated to bring a portion thereof into engagement with a portion of the butterfly element to thereby constrain rotation of the butterfly element.

The axis of rotation of the override shaft may be coaxial with the axis of rotation of the butterfly element. The override shaft may be disposed around a shaft the butterfly element.

The manual override shaft may be rotatable to a third override position in which rotation of the butterfly element relative to the override shaft is prevented by interaction of part of the butterfly element with part of the override shaft.

The override shaft may comprises a slot and the butterfly element comprises a pin constrained within the slot, wherein in the first neutral position the pin is permitted to move by rotation of the butterfly element within the slot, and wherein in the second override position the slot is rotated relative to the butterfly element so that the pin abuts a first abutment surface of the slot.

The pin may be rigidly coupled to the butterfly element, and may be spaced from the axis (e.g. spaced from the shaft) about which the butterfly element rotates, so that rotation of the butterfly element causes the pin to move along an arc of a circle. When the override shaft is in the first neutral position, that movement of the pin is accommodated by the slot, which slot may be arcuate or curved to permit free movement of the pin therein. The range of movement of the pin may be limited by the range of movement of the butterfly element e.g. between its first fully open position and its second fully closed position.

In the second override position, the slot of the override shaft is rotated relative to the butterfly element and the pin, and therefore reduces the range of movement of the pin. The override shaft may then be rotated until the first abutment surface (e.g. a first end of the slot) contacts the pin, thereby preventing movement of the pin using the first abutment surface. When the butterfly element is in its first fully open position, the pin cannot move in one direction because the butterfly element cannot rotate in that direction, and cannot move in the other direction because the first abutment surface of the slot prevents it.

In the third override position, the slot is rotated relative to the butterfly element in the opposite direction, and therefore reduces the range of movement of the pin in the other direction. The override shaft is then rotated until a second abutment surface (e.g. a second end of the slot) contacts the pin, thereby preventing movement of the pin using the second abutment surface. When the butterfly element is in its first fully closed position, the pin cannot move in one direction because the butterfly element cannot rotate in that direction, and cannot move in the other direction because the second abutment surface of the slot prevents it.

Although the manual override described in detail herein comprises the slot in the override shaft and the pin as part of the butterfly element, other arrangements may be possible.

The butterfly valve assembly may comprise a locking key urged against the override shaft and received in a first recess therein when the override shaft is in the first neutral position.

The locking key may be urged by any suitable biasing mechanism such as a locking spring. To rotate the override shaft, sufficient force must be applied to push the locking key back against the urging force and cause it to leave the first recess.

The override shaft may comprise a second recess, wherein in the second override position the locking key is received by the second recess. The override shaft may comprise a third recess, wherein in the third override position the locking key is received by the third recess.

The override shaft may therefore be held in the second and third override positions by action of the locking key urged into the second and third recesses. The locking key may be held with sufficient force in the recesses so that the override shaft will not be rotated by action of the pin against the first or second abutment surface.

The locking key may ensure that the override shaft is rotated to one of the first neutral position, the second override position, or the third override position. When the override shaft is rotated to one of the above positions, the locking key will be received by the corresponding recess and prevent further rotation without the use of additional force. A user can therefore be confident that the override shaft (and therefore the butterfly element) is in the desired position.

The use of a manual override is particularly advantageous for a butterfly valve assembly as described herein, because the assembly lacks an electronic controller that easily allows the valve to be controlled. Thus, despite the lack of an electronic controller or other electronic supervision of the butterfly valve assembly (and particularly of the butterfly element), the assembly can simply and reliable be closed or opened as needed.

In fact, the provision of a manual override in the butterfly valve assembly is considered novel and inventive in its own right. Thus, according to a second aspect of the invention there is provided a butterfly valve assembly comprising a butterfly element configured to control fluid flow through a main conduit; and a manual override operable to lock the butterfly element in a fully open position or a fully closed position.

The butterfly valve assembly may comprise a butterfly controller configured to control the butterfly element, comprising a first chamber for receiving fluid at a first pressure, a second chamber for receiving fluid at a second pressure, and an actuator responsive to the first pressure and the second pressure; and a relief valve arranged to regulate the first pressure in the first chamber within a predetermined pressure range, wherein the relief valve comprises an adjustment mechanism for adjusting the predetermined pressure range.

The butterfly valve assembly of the second aspect of the invention may comprise any of the features described herein with reference to the first aspect of the invention. In particular, the butterfly valve assembly of the second aspect of the invention may comprise the features of the manual override described herein with reference to the first aspect of the invention.

The butterfly valve assembly may be an integrated butterfly valve assembly. The assembly may comprise a housing, and the butterfly element, the butterfly controller, and the relief valve may be within the housing. The shut-off valve may be within the housing. The assembly may therefore be a single, unitary product.

According to a third aspect of the present invention there is provided an anti-ice system, for example for an aircraft, comprising a butterfly valve assembly. The butterfly valve assembly may a butterfly valve assembly as described herewith with reverence to the first and/or second aspect of the present invention, and may therefore comprise any and/or all of the features described herein with reference to those aspects.

According to a fourth aspect of the invention there is provided an aircraft comprising an anti-ice system as recited herein with reference to the third aspect of the invention.

According to a fifth aspect of the present invention there is provided a method of manually locking a butterfly element of a butterfly valve assembly in a fully open position and/or a fully closed position, comprising operating a manual override to bring a part of the manual override into contact with a part of the butterfly element to thereby prevent movement of the butterfly element using the manual override.

The method may comprise providing the butterfly element with a pin, and providing an override shaft of the manual override with a slot so that movement of the pin is constrained within the slot. The method may comprise rotating the override shaft relative to the pin, to thereby reduce the range of movement of the pin. The method may comprise rotating the override shaft in a first direction to prevent movement of the pin in an opposite, second direction. The method may comprise rotating the override shaft in the second direction to prevent movement of the pin in the opposite, first direction. The method may comprise rotating the override shaft in a first direction to bring a first abutment surface of the slot into contact with the pin and thereby prevent movement of the pin using the first abutment surface. The method may comprise rotating the override shaft in a second direction to bring a second abutment surface of the slot into contact with the pin and thereby prevent movement of the pin using the second abutment surface.

The method may comprises using the butterfly valve assembly and/or any of its features as recited herein with reference to the first aspect of the invention and/or the second aspect of the invention. The method may comprise using an anti-ice system and/or any of its features as recited herein with reference to the third aspect of the invention. The method may comprise using an aircraft and/or any of its features as recited herein with reference to the fourth aspect of the invention.

FIGURES

Certain preferred embodiments of the invention are described below by way of example only and with reference to the accompanying drawings in which.

DESCRIPTION

Figure 1:
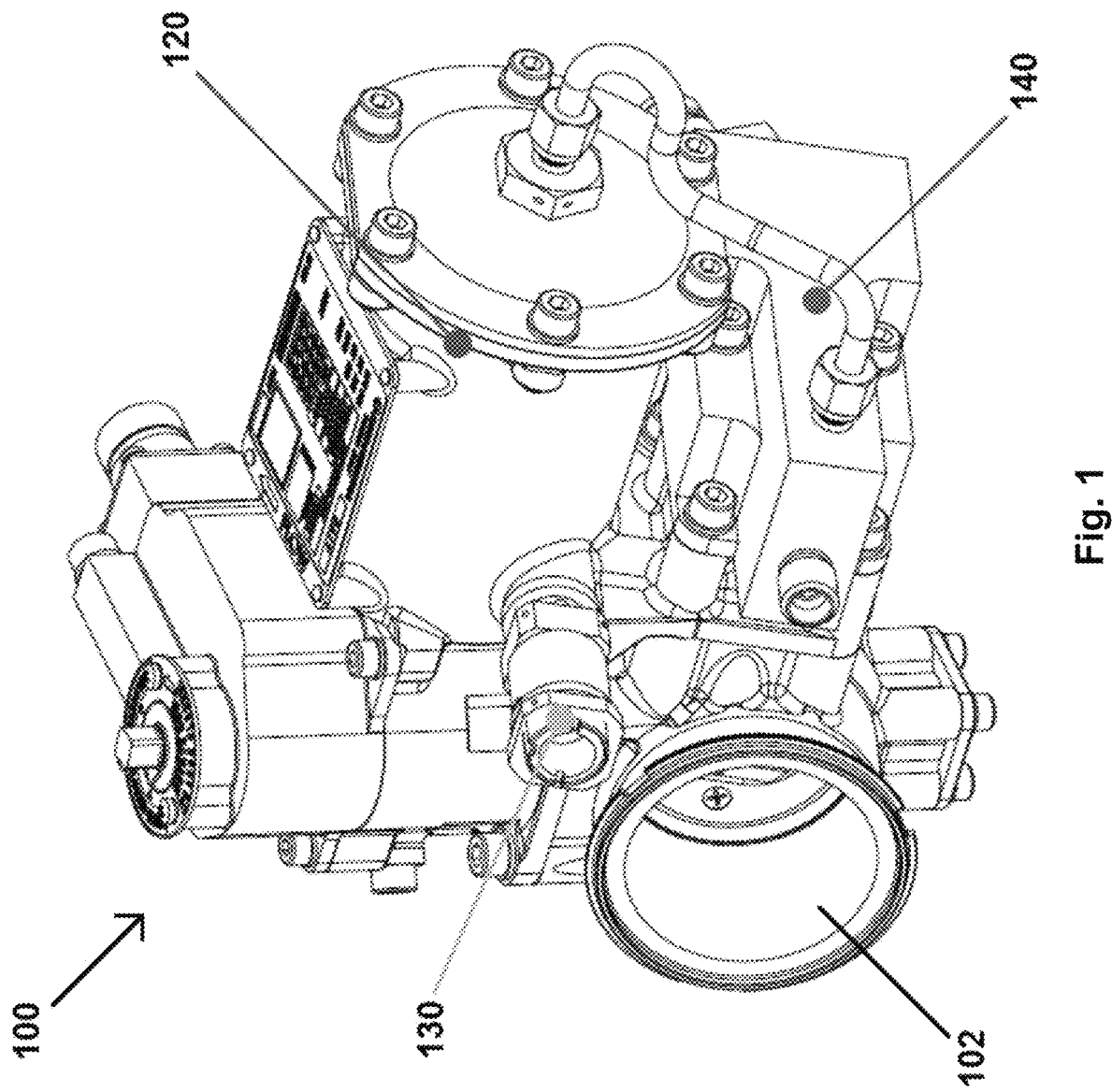
FIG. 1 shows butterfly valve assembly for regulating downstream fluid pressure.

FIG. 1 shows an anti-ice butterfly valve assembly 100 for regulating downstream pressure of a main conduit 102. The assembly 100 preferably regulates the downstream pressure within a predetermined regulation band. The butterfly valve assembly 100 comprises an integrated butterfly controller 120, integrated pressure relief valve 130, and integrated shut-off valve 140. The assembly 100 is therefore a single unit in which the components described herein are installed e.g. within a housing.

Figure 2A:
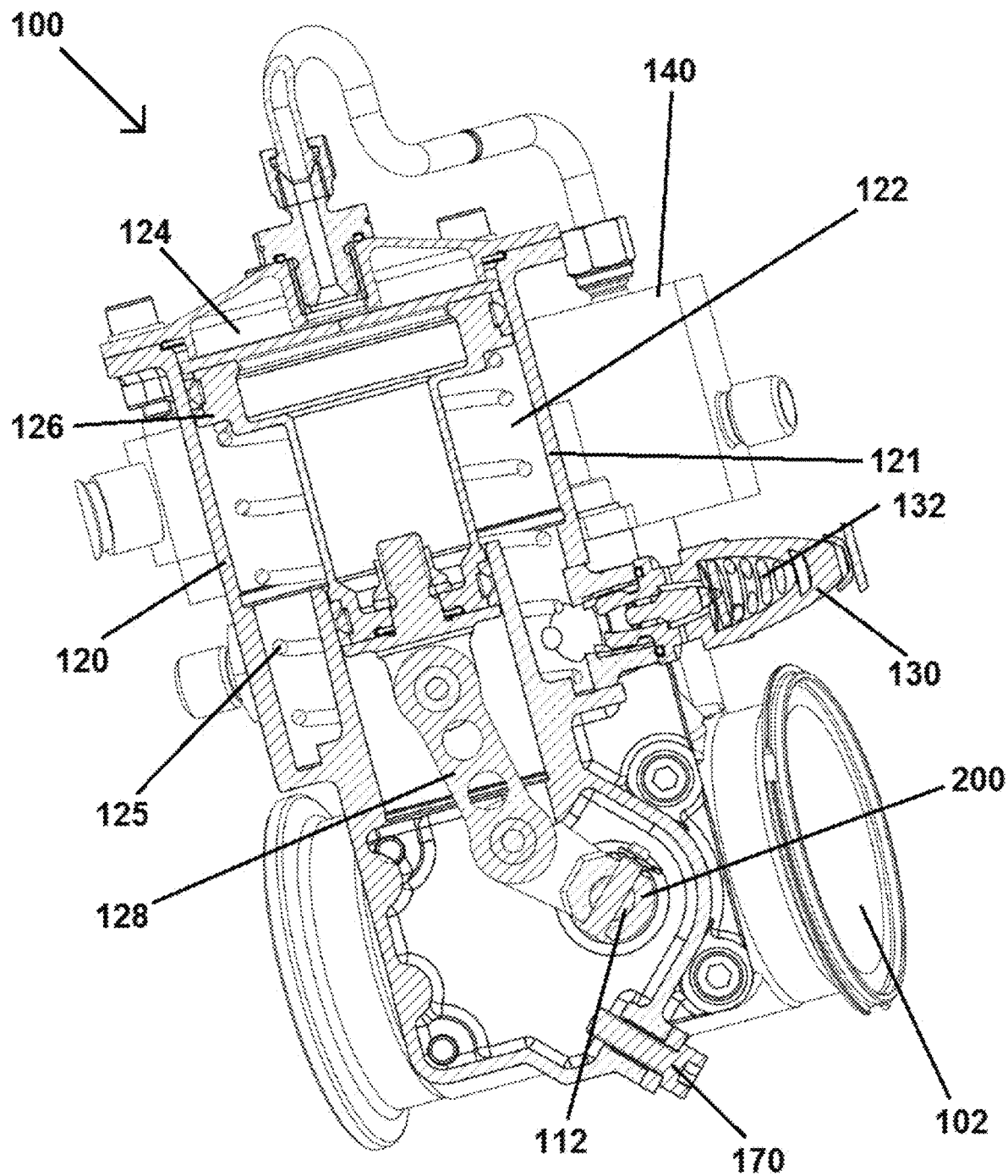
FIG. 2A shows a cross-section through the butterfly valve assembly of FIG. 1 in a first configuration.

FIG. 2A shows a cross-section through the butterfly valve assembly 100 when the butterfly valve assembly 100 is in a first configuration e.g. a fully open configuration. The butterfly controller 120 comprises a first chamber 122 and a second chamber 124, each of which receives fluid at a particular pressure from the main conduit 102, as explained in more detail below with reference to the FIG. 4. The butterfly controller 120 also includes a piston 126 comprising a connection 128. The piston 126 and connection 128 are moveable in response to a pressure difference between the first chamber 122 and the second chamber 124. The butterfly controller 120 also comprises a spring 125 in the first chamber 122, which spring 125 is arranged to urge the piston 126 and connection 128 into a first position (as shown in FIG. 2A). When the force of the spring 125 and the force from pressurised fluid in the first chamber 122 are together greater than the force from the pressurised fluid in the second chamber 124, the piston 126 moves towards the first position, typically its fully open position so that the butterfly valve assembly 100 permits as much fluid as possible through the main conduit 102. As can be seen from FIG. 2A, the first chamber 122 and second chamber 124 are complementary divisions of a larger fluid chamber 121 in which the piston 126 moves during use.

Figure 2B:
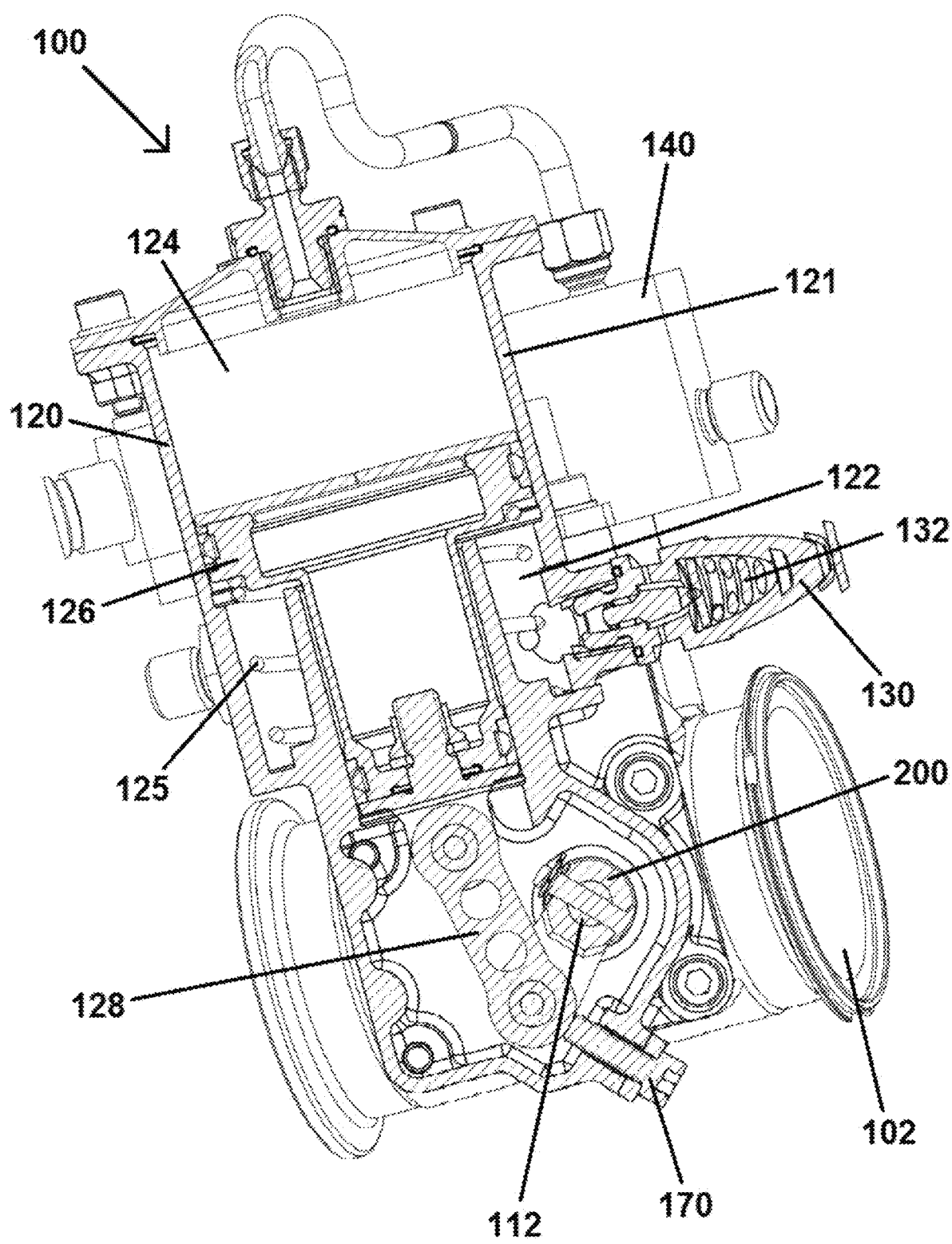
FIG. 2B shows the cross-section of FIG. 2A with the butterfly valve assembly in a second configuration.

FIG. 2B shows the configuration of the butterfly valve assembly 100 when pressure in the second chamber 124 increases so the force therefrom on the piston 126 overcomes the combined force from the spring 125 and fluid pressure in the first chamber 122. Consequently, the piston 126 and connection 128 move to a second position, depicted in FIG. 2B.

The connection 128 mechanically couples the piston 126 to a shaft 112 of a butterfly element 110 (see FIG. 3) in the conduit 102, so that movement of the piston 126 and connection 128 rotate the shaft 112 about its axis (the axis is substantially normal to the page as shown in FIGS. 2A and 2B), and thereby rotate the butterfly element 110 in the conduit 102. The butterfly element 110 is a disc disposed within the conduit 102, and the shaft 112 extends substantially along a diameter of the disc and a cross-section of the main conduit 102. The area of the butterfly element 110 is only slightly smaller than the cross-section of the main conduit 102, so that different degrees of rotation of the butterfly element 110 cause it to cover or block different amounts of the cross-section of the main conduit 102. When the butterfly element 110 is rotated to substantially cover the entire cross-section of the main conduit 102, the butterfly valve assembly 100 is in its fully closed position, since the butterfly element 110 prevents as much fluid flow through the main conduit 102 as possible. When the butterfly element 110 is rotated by approximately 90° to its fully closed orientation, it covers or blocks as little of the cross-section of the main conduit 102 as possible (and instead extends as far as possible along the length of the main conduit 102), and the butterfly valve assembly 100 is in its fully open configuration, since the butterfly element 110 permits as much fluid flow through the main conduit 102 as possible.

In FIG. 2A, the shaft 112 and butterfly element 110 are in the fully open position, and in FIG. 2B, the shaft 112 and butterfly element 110 are rotated to the fully closed position. In the second position shown in FIG. 2B, the connection 128 abuts an adjustment screw 170 provided to limit movement of the connection 128 and thereby limit rotation of the shaft 112 and butterfly element 110. In the first position shown in FIG. 2A, the piston 126 abuts the end of the second chamber 124 to thereby limit rotation of the shaft 112 and butterfly element 110 in the other direction.

Thus, the balance of pressures in the first chamber 122 and second chamber 124 against the piston 126, together with the spring 125, control movement of the piston 126 and the connection 128, which in turn controls the rotational position of the shaft 112 and butterfly element in the main conduit 102. The butterfly element 110 is thereby rotated to open, regulate, or close the main conduit 102. Depending on the position of the piston 126 in the fluid chamber 121, and hence the degree of rotation of the butterfly element 110, different amounts/rates of fluid will be permitted through the conduit 102 by the butterfly element 110.

In conventional assemblies, since the spring of the butterfly controller is fundamental to the movement of the piston (and hence to the opening and closing of the butterfly element) it must be carefully calibrated and tuned during installation to ensure that the butterfly element rotates as desired, and thereby regulates fluid flow through the conduit as needed. The spring is therefore typically provided with a means to adjust it, such as a means to adjust preloading of it. However, the spring is relatively large and is necessarily located within the butterfly controller, so it is difficult to access and calibrate. This leads to imprecision in the operation of the piston, which then manifests as a relatively wide regulation band within which the butterfly assembly controls the pressure.

Figure 3:
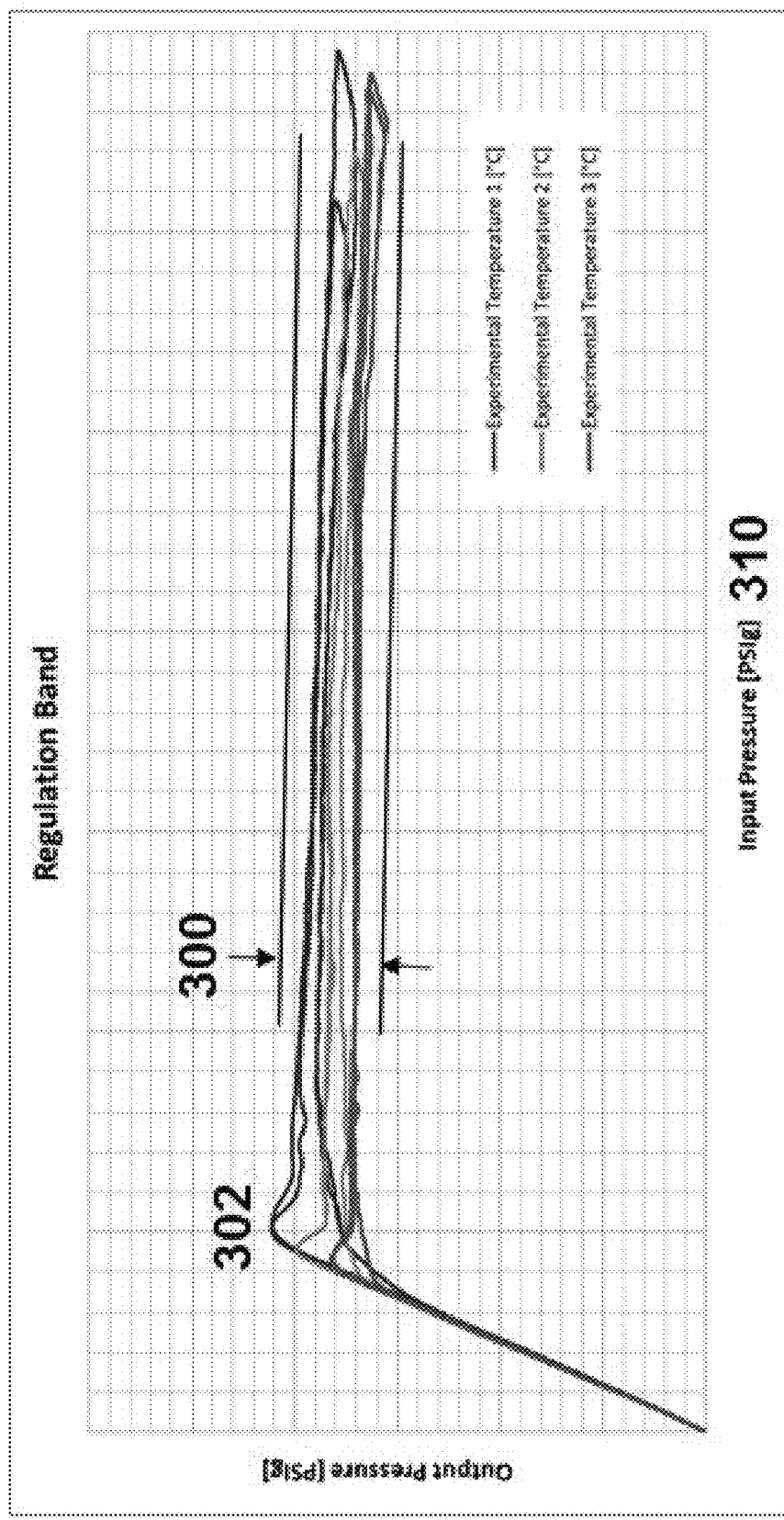
FIG. 3 shows a plot illustrating a regulation band of the butterfly valve assembly.

FIG. 3 shows a plot with an example of the regulation band 300 for the butterfly valve assembly 100. The different lines on the plot show the relationship between an input pressure 310 to the butterfly valve assembly 100 and an output pressure 320 from the butterfly valve assembly 100 for different temperatures. For low input pressures 310, the output pressure 320 increases approximately constantly with the input pressure 310. However, once the input pressure 310 reaches a threshold 302 (shown approximately), the butterfly valve assembly 100 regulates the output pressure 320 within the regulation band 300 indicated approximately by the arrows. Thus, as the input pressure 310 increases beyond the threshold 302, the butterfly valve assembly 100 maintains the output pressure 320 within the regulation band. As the input pressure 310 drops, the output pressure 320 is maintained within the regulation band 300, but need not take the same value it did when the input pressure was increasing. The regulation band 300 can therefore be thought of a the limits of the hysteresis described by the progression of output pressure 320 with respect to input pressure 310. In general, significant variation of regulated output pressure 320 for a given input pressure 310 is undesirable, and it is therefore preferable to make the regulation band 300 as narrow as possible i.e. to control the output pressure 320 based on the input pressure 310 as precisely as possible.

To narrow the regulation band 300, to improve control over operation of the butterfly controller 120, and hence over the rotation of the butterfly element 110 and the pressure regulation of the butterfly valve assembly 100, the butterfly valve assembly 100 comprises a relief valve 130 arranged to regulate pressure within the first chamber 122 of the butterfly controller 120. The relief valve 130 is a pilot valve that works on relatively little flow. As seen in FIGS. 1, 2A and 2B, it is located on an outer surface of the butterfly valve assembly 100 and is therefore accessible and adjustable after assembly and/or installation of the butter valve assembly 100. The relief valve 130 comprises a spring 132 and a tuning screw that is accessible once the butterfly valve assembly 100 has been assembled. As such, the relief valve 130 may be adjusted during use (i.e. during pressure regulation) of the butterfly valve assembly 100.

Figure 4:
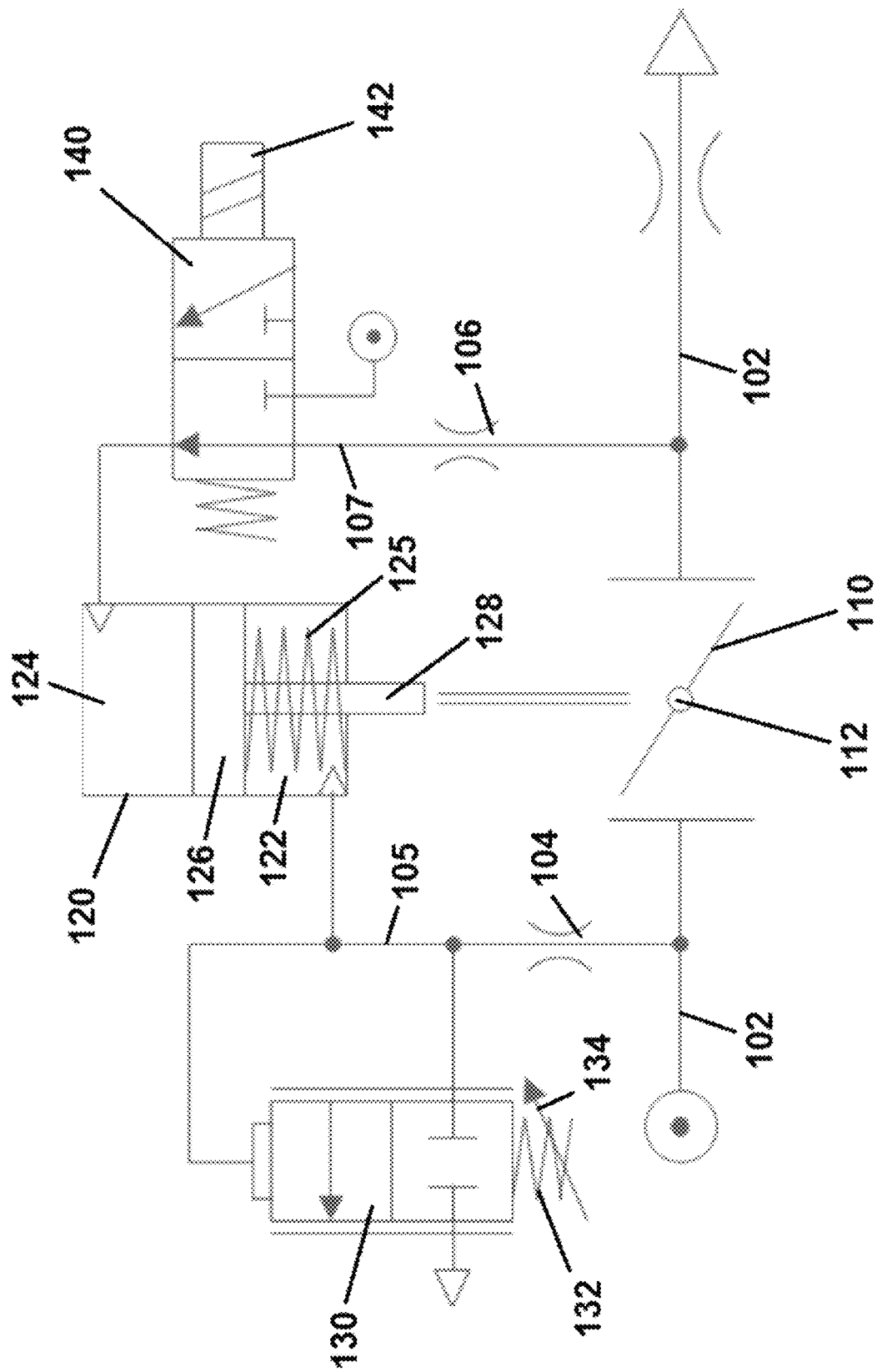
FIG. 4 shows a schematic of the butterfly valve assembly of FIGS. 1, 2A and 2B.

FIG. 4 shows a schematic of the butterfly valve assembly 100. The butterfly element 110 is disposed within the main conduit 102, and is rotatable about its shaft 112 to open, regulate, and close the main conduit 102 depending on its rotational position. The piston 126 of the butterfly controller 120 is mechanically coupled to the shaft 112 of the butterfly element 110 by the connection 128 as described above. Movement of the piston 126 is determined by the pressure difference between the first chamber 122 and the second chamber 124, together with the spring 125.

The assembly 100 also includes the relief valve 130 fluidly connected to the main conduit 102 upstream of the butterfly element 110 via an orifice 104. The relief valve 130 is also fluidly connected to the first chamber 122 of the butterfly controller 120, so as to regulate pressure therein. The relief valve 130 will crack when pressure in the line 105 increases beyond a predetermined threshold which is set by a spring 132 of the relief valve 130, together with a tuning screw 134. Thus, the relief valve 130 will prevent pressure in the first chamber 125 increasing beyond the predetermined threshold. The relief valve 130 therefore decouples pressure in the line 105 and the first chamber 122, from the pressure in the main conduit 102 upstream of the butterfly element 110.

Moreover, the spring 132 of the relief valve 130 is adjustable by action of the tuning screw 134, and is smaller and therefore more easily tuned than the spring 125 of the butterfly controller 120. Further, the tuning screw 134 is accessible even after assembly of the butterfly valve assembly 100, so calibration and tuning of the valve assembly 100 can be simply accomplished. As a consequence, pressure in the first chamber 122 of the butterfly controller 120 can be regulated by use of the tuning screw 134 the relief valve 130 as needed, instead of e.g. tuning a spring analogous to the spring 125 of the butterfly controller 120. Thus, the regulation band 300 of the butterfly valve assembly 100 can be tighter than for conventional butterfly valve assemblies.

The orifice 104 is a fixed orifice and can be sized to provide a predetermined restriction of fluid flow (and hence of pressure drop). It also helps dampen the response of the butterfly valve assembly 100, so that pressure regulation is smooth. That is, the orifice 104 reduces the rate of pressure changes in the portion of the circuit comprising the first chamber 122 and relief valve 130, relative to pressure changes in the main conduit 102. The orifice 104 therefore helps to stabilise operation of the relief valve 130, the first pressure in the first chamber 122, and thereby the operation of the entire butterfly valve assembly 100. The orifice 104 may be a fixed size, and is narrower than the main conduit and the line 105 that it connects. It thereby restricts fluid flow from the main conduit 102 to the line 105 and reduces the dynamic effects of pressure changes on the relief valve 130 and the first pressure in the first chamber 122.

The butterfly valve assembly 100 also comprises a shut-off valve 140, which controls fluid flow to the second chamber 124 of the butterfly controller 120. The shut-off valve is actuated by a solenoid 142 between a first position and a second position, and is fluidly connected by a line 107 to the main conduit 102 downstream of the butterfly element 110, via a second orifice 106. The shut-off valve 140 is also fluidly connected to a line containing fluid at supply pressure. The solenoid 142 is therefore operable to switch between supplying fluid to the second chamber 124 from the line 107, or supplying fluid to the second chamber 124 from the line at supply pressure. The force on the piston 126 from the fluid at supply pressure will always be greater than the combined force from the spring 125 and regulated fluid pressure in the first chamber 122, and therefore when the shut-off valve 140 is configured to provide to fluid at supply pressure to the second chamber 124, the piston 126 will be moved to its second position, rotating the butterfly element 110 to close the main conduit 102. The shut-off valve 140 is therefore simply operable to move the butterfly valve assembly 100 to its fully closed configuration. It can also be operated to move the butterfly valve assembly 100 to a regulated mode in which the pressure in the second chamber 124 is related to output pressure 320 of the assembly 100, so that the output pressure 320 is automatically regulated by movement of the piston 126.

Similarly to the orifice 104, the orifice 106 is of a fixed size and is configured to provide a predetermined restriction of fluid flow (and hence a pressure drop). It also helps dampen the response of the butterfly valve assembly 100, so that pressure regulation is smooth.

Figure 5:
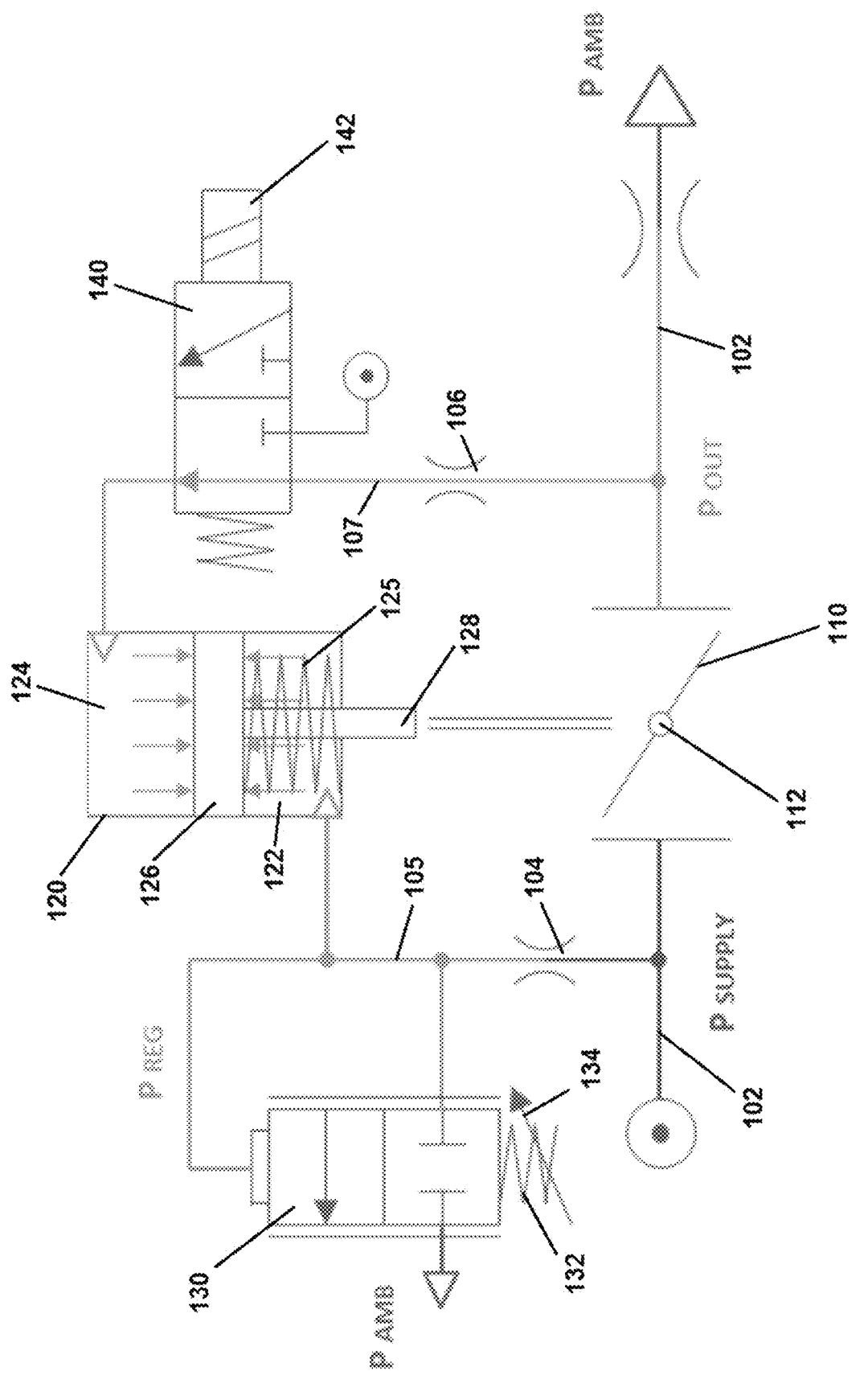
FIG. 5 shows the schematic of FIG. 4 during use.

FIG. 5 shows the schematic of FIG. 4 with exemplary pressures indicated. Upstream of the butterfly element 110 in the main conduit 102, fluid pressure is at supply pressure $P_{SUPPLY}$. Pressure in the line 105 and first chamber 122 is at $P_{REG}$, and is controlled by the relief valve 130 with the adjustable spring 132. The pressure in line 107 and the second chamber 124 is indicative of the pressure $P_{OUT}$.

During use, as the pressure $P_{SUPPLY}$ in the main conduit 102 upstream of the butterfly element 110 increases from ambient pressure $P_{AMB}$, the pressure $P_{REG}$ increases approximately in line with $P_{SUPPLY}$. Once $P_{REG}$ approaches the predetermined threshold set by the adjustable spring 132 and tuning screw 134, the relief valve 130 operates to prevent further pressure increase, thereby constraining $P_{REG}$ to below the predetermined threshold, causing its increase to plateau. The pressure $P_{REG}$ in the first chamber 122 then acts (together with the force from the spring 125) on the piston 126 against the pressure $P_{OUT}$ in the second chamber 124.

If the pressure $P_{OUT}$ downstream of the butterfly element 110 increases (e.g. because $P_{SUPPLY}$ increases), then the force on the piston 126 in the second chamber 124 will increase compared to the pressure $P_{REG}$ in the first chamber 122 regulated by the relief valve 130. The piston 126 will therefore move towards the second position, rotating the butterfly element 110 towards its closed position and thereby reducing fluid flow through the main conduit 102. Thus, $P_{OUT}$ will be decreased and the downstream pressure will be controlled (e.g. as shown in FIG. 3).

If on the other hand, the pressure $P_{OUT}$ decreases compared to the pressure $P_{REG}$, then the piston 126 will be moved towards its first position, opening the butterfly element 110 more, and thereby increasing the fluid flow through the conduit 102 and subsequently raising the pressure $P_{OUT}$. The pressure $P_{REG}$ will change more slowly than the pressure $P_{SUPPLY}$ because the orifice 104 will dampen the changes.

The butterfly valve assembly 100 may therefore regulate downstream pressure automatically. The provision of the adjustable spring 132, which is easier to adjust than the spring 125 because the tuning screw 134 is at an external surface of the assembly 100 and accessible during use, allows the regulation of pressure $P_{REG}$ so that the operation of the butterfly controller 120 is more easily controlled. It is also easier to calibrate the assembly 100 after installation in e.g. an anti-ice system.

The butterfly valve assembly 100 may not have any electronic components except for the solenoid 142, and can therefore be used in higher temperature environments than e.g. electrically driven, motor controlled butterfly valves.

Figure 6:
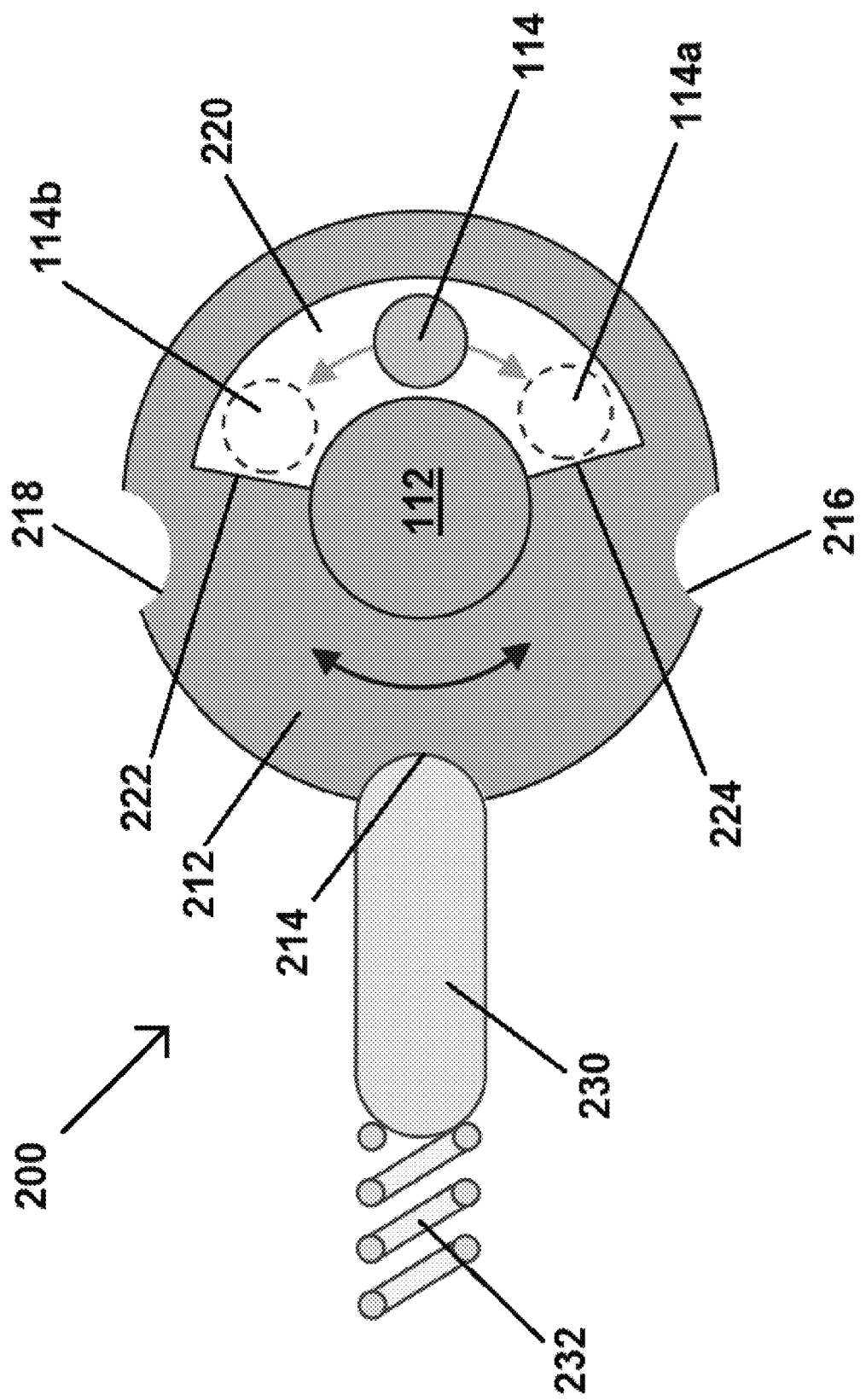
FIG. 6 shows a schematic of a manual override for locking the butterfly valve assembly in an open positon or a closed position.

Although the butterfly valve assembly 100 can automatically regulate pressure, it is sometimes desirable to manually override that function. FIG. 6 shows a schematic of a manual override 200 for the butterfly valve assembly 100. The manual override 200 is provided with the shaft 112 of the butterfly element 110, and comprises a manual override shaft 212 disposed about the shaft 112, and rotatable relative thereto. The manual override shaft 212 also comprise an arcuate (curved) slot 220 defined therein. A pin 114 is constrained within the slot 220. The pin 114 is adjacent the shaft 112 and rigidly coupled to the butterfly element 110 and/or shaft 112 so that it rotates therewith about the same axis as the shaft 112 and butterfly element 110. The pin 114 is therefore off-axis. Since, the pin 114 is spaced a fixed distance from the axis about which the shaft 112 rotates, when the butterfly element 110 rotates, the pin 114 moves along an arc, all the while being constrained within the slot 220 of the override shaft 212.

FIG. 6 shows a schematic of the configuration of the manual override 200 when the butterfly valve assembly 100 is operating as normal i.e. automatically regulating downstream pressure 320. The butterfly element 110 is partially open, rotated about half-way between its fully open position and its fully closed position. The pin 114 is therefore approximately mid-way along the slot 220.

A locking key 230 is biased by a locking spring 232 against the override shaft 212, and mates with a first recess 214 on the outer surface of the override shaft 212 to thereby hold the override shaft 212 (and hence also the slot 220) in the position shown.

When the butterfly element 110 rotates to its fully open position, the pin 114 travels within the slot 220 to the position indicated by the dashed outline 114a. When the butterfly element 110 rotates to its fully closed position, the pin 114 travels within the slot 220 to the position indicated by the dashed outline 114b.

As described above, the movement of the butterfly element 110 is constrained by the travel of the piston 126 and connection 128. In its first position, the piston 126 abuts the end of the second chamber 124 and therefore prevents further rotation of the butterfly element 110 in that direction. In its second position, the connection 128 abuts the adjustment screw 170, thereby preventing further rotation of the butterfly element 110 in that direction. (The adjustment screw 170 is provided to calibrate the travel of the butterfly element 110 after assembly of the butterfly valve assembly 100.)

The override shaft 212 is rotatable about the same axis of rotation as the shaft 112 of the butterfly element 110 (the axis is normal to the page in FIG. 6). To manually override the position of the butterfly element 110, the override shaft 212 is rotated about its axis (normal to the page in FIG. 5) in the desired direction, so that the pin 114 abuts a first abutment surface 222 of the slot 220, or a second abutment surface 224 of the slot 220.

Figure 7A:
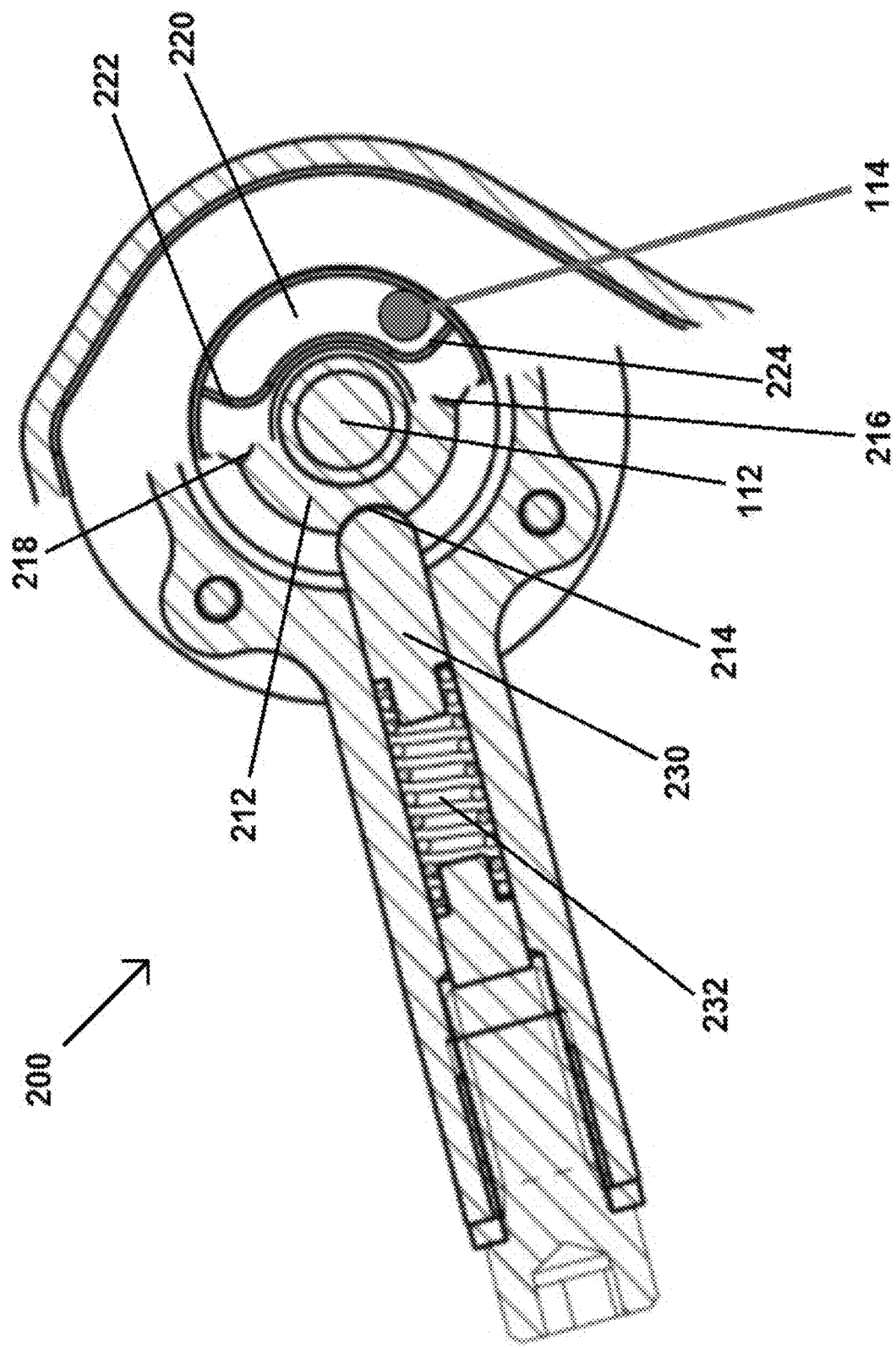
FIG. 7A shows the manual override of FIG. 6 with a partial cut-away, showing the butterfly valve assembly in a fully open configuration.

FIG. 7A shows the manual override 200 with a partial cut-away (so the figure shows two different depths of the manual override 200 within the assembly 100). The pin 114 has been rotated clockwise about the shaft 112 by rotation of the butterfly element 110 so that it has moved to its fully open position 114a. In FIG. 7A, the override shaft 212 is in its neutral position, allowing automatic pressure regulation by the assembly 100 (i.e. not manually overriding the rotation of the butterfly element 110 and pressure regulation progress described above). The pin 114 cannot travel further in the clockwise direction because the piston 126 is in abutment with the far end of the second chamber 124.

To lock the butterfly element 110 in the fully open position, the override shaft 212 is rotated in the clockwise direction, rotating the slot 220 clockwise until the first abutment surface 222 contacts the pin 114. The pin 114 then cannot travel in the anticlockwise direction because it is prevented by contact with the first abutment surface 222 of the slot 220. The pin 114 is therefore held stationary, and since the pin 114 is rigidly connected to the butterfly element 110 and/or shaft 112, the butterfly element 110 is locked in the fully open position.

As a force is applied to rotate the override shaft 212 in the clockwise direction, the locking key 230 is forced from the first recess 214 and pushed in against the action of the locking spring 232. The override shaft 212 then rotates until a second recess 216 reaches the locking key 230 and the locking key 230 is urged into the second recess 216 by the locking spring 232. The force from the locking spring 232 acting to hold the locking key 230 in the second recess 216 is sufficient to prevent unwanted rotation of the override shaft 212 e.g. by force from the pin 114 acting on the first abutment surface 222.

Figure 7B:
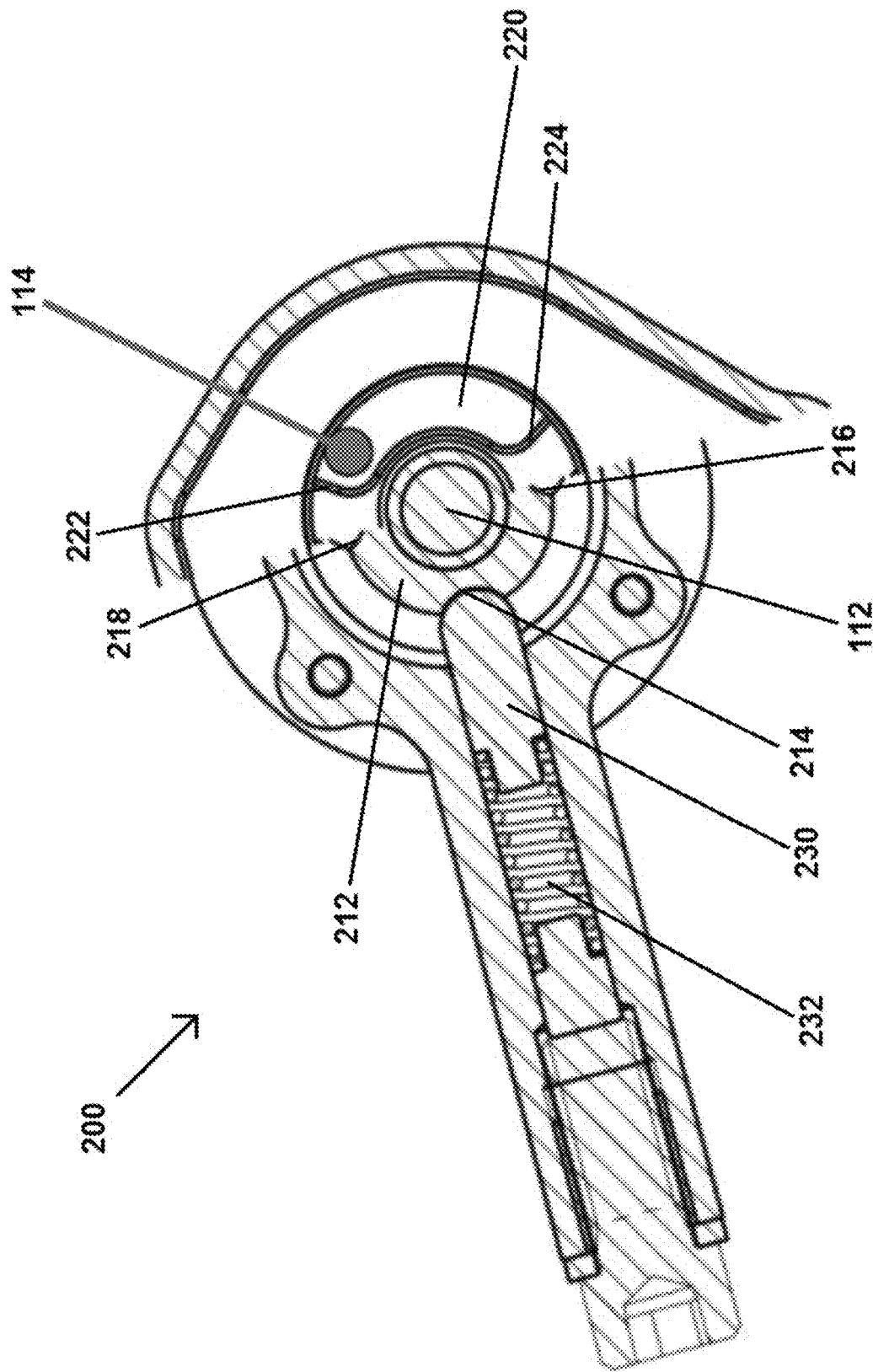
FIG. 7B shows the manual override of FIGS. 6, and 7A with a partial cut-away, showing the butterfly valve assembly in a fully closed configuration.

FIG. 7B shows the manual override 200 with the same partial cut-away as shown in FIG. 7A. In the depicted case though, the butterfly element 110 has been rotated anticlockwise about the shaft 112 so that it has moved to its fully closed position 114b. The pin 114 cannot travel further in the anticlockwise direction because the connection 128 is in abutment with the adjustment screw 170.

To lock the butterfly element 110 in the fully closed position, the override shaft 212 is rotated in the anticlockwise direction, rotating the slot 220 anticlockwise until the second abutment surface 224 contacts the pin 114. The pin 114 then cannot travel in the clockwise direction because it is prevented by the second abutment surface 224 of the slot 220. The pin 114 is therefore held stationary, and since the pin 114 is rigidly connected to the butterfly element 110 and/or shaft 112, the butterfly element 110 is locked in the fully closed position.

Similarly to the process described above for locking the override shaft 212 in the manual override fully open position, as a force is applied to rotate the override shaft 212 in the anticlockwise direction, the locking key 230 is forced from the first recess 214 and pushed in against the action of the locking spring 232. The override shaft 212 then rotates until a third recess 218 reaches the locking key 230 and the locking key 230 is urged into the third recess 216 by the locking spring 232. The force from the locking spring 232 acting to hold the locking key 230 in the third recess 218 is sufficient to prevent unwanted rotation of the override shaft 212 e.g. by force from the pin 114 acting on the second abutment surface 224.

Thus, the butterfly element 110, and hence the butterfly valve assembly 100, can be manually overridden by the manual override 200 so that it is locked in the fully open position or the fully closed position. The provision of the first, second and third recesses 214, 216, 218 also ensures that a user will rotate the override shaft 212 to the desired position, because the user will feel the locking key 230 slip into place in the relevant recess.

The override shaft can 212 be rotated by any suitable means, for example using a square key at one end (e.g. having a square recess for receiving the key extending from the assembly 100), a handle, a lever, or the like. The use of a key may be preferred to ensure that the manual override is not engaged inadvertently.

The invention claimed is:

1. A butterfly valve assembly comprising:
   a butterfly element configured to control fluid flow through a main conduit; and
   a butterfly controller configured to control the butterfly element, comprising a first chamber for receiving fluid at a first pressure, a second chamber for receiving fluid at a second pressure, and an actuator responsive to the first pressure and the second pressure; and
   a relief valve arranged to regulate the first pressure in the first chamber within a predetermined pressure range, wherein the relief valve comprises an adjustment mechanism for adjusting the predetermined pressure range;
   a shut-off valve actuated by a solenoid and arranged to control the second pressure of fluid in the second chamber of the butterfly controller by switching between supplying to the second chamber of the butterfly controller (i) fluid from the main conduit downstream of butterfly element, and (ii) fluid from a source other than the main conduit downstream of the butterfly element, the shut-off valve thereby being operable to move the butterfly element to its fully closed position.

2. A butterfly valve assembly as claimed in claim 1, wherein the adjustment mechanism of the relief valve comprises a spring and a tuning screw operable to adjust the pressure at which the relief valves opens, to thereby adjust the predetermined pressure range.

3. A butterfly valve assembly as claimed in claim 1, wherein the butterfly controller comprises a biasing element arranged to bias the actuator to a first position.

4. A butterfly valve assembly as claimed in claim 1, further comprising:
   an orifice fluidly connecting the relief valve to the main conduit at a location upstream of the butterfly element, wherein the orifice is configured to restrict fluid flow through itself.

5. A butterfly valve assembly as claimed in claim 1, further comprising:
   a manual override operable to lock the butterfly element in a fully open position or a fully closed position.

6. A butterfly valve assembly as claimed in claim 5, wherein the manual override comprises an override shaft rotatable between a first neutral position in which rotation of the butterfly element relative to the override shaft is permitted, and a second override position in which rotation of the butterfly element relative to the override shaft is prevented by interaction of part of the butterfly element with part of the override shaft.

7. A butterfly valve assembly as claimed in claim 6, wherein the manual override shaft is rotatable to a third override position in which rotation of the butterfly element relative to the override shaft is prevented by interaction of part of the butterfly element with part of the override shaft.

8. A butterfly valve assembly as claimed in claim 7, wherein the override shaft comprises a slot and the butterfly element comprises a pin constrained within the slot, wherein in the first neutral position the pin is permitted to move by rotation of the butterfly element within the slot, and wherein in the second override position the slot is rotated relative to the butterfly element so that the pin abuts a first abutment surface of the slot.

9. A butterfly valve assembly as claimed in claim 6, further comprising:

a locking key urged against the override shaft and received in a first recess therein when the override shaft is in the first neutral position.

10. A butterfly valve assembly as claimed in claim 9, wherein the override shaft comprises a second recess, wherein in the second override position the locking key is received by the second recess.

11. A butterfly valve assembly as claimed in claim 10, wherein the override shaft comprises a third recess, wherein in the third override position the locking key is received by the third recess.

12. A butterfly valve assembly as claimed in claim 1, wherein the butterfly valve assembly is an integrated butterfly valve assembly.

13. An anti-ice system for an aircraft comprising:
the butterfly valve assembly as claimed in claim 1.

14. An aircraft comprising the anti-ice system as claimed in claim 13.

* * * * *